(12) United States Patent
Miwa

(10) Patent No.: US 9,405,094 B2
(45) Date of Patent: Aug. 2, 2016

(54) PHOTOGRAPHING LENS, OPTICAL APPARATUS AND METHOD FOR MANUFACTURING THE PHOTOGRAPHING LENS

(71) Applicant: NIKON CORPORATION, Chiyoda-ku, Tokyo (JP)

(72) Inventor: Satoshi Miwa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/556,113

(22) Filed: Nov. 29, 2014

(65) Prior Publication Data

US 2015/0085387 A1    Mar. 26, 2015

Related U.S. Application Data

(63) Continuation of application No. PCT/JP2013/003384, filed on May 29, 2013.

(30) Foreign Application Priority Data

May 30, 2012   (JP) .................................. 2012-122709

(51) Int. Cl.
  *G02B 9/12*   (2006.01)
  *G02B 9/14*   (2006.01)
  *G03B 5/00*   (2006.01)
  *G02B 27/64*   (2006.01)
  (Continued)

(52) U.S. Cl.
  CPC ................. *G02B 9/14* (2013.01); *G02B 15/173* (2013.01); *G02B 27/646* (2013.01); *G03B 5/00* (2013.01); *G03B 19/12* (2013.01)

(58) Field of Classification Search
  CPC .......... G02B 9/14; G02B 15/173; G02B 15/28
  See application file for complete search history.

(56) References Cited

U.S. PATENT DOCUMENTS 5,438,455 A * 8/1995 Nakatsuji ............... G02B 13/02
                                                                 359/684
5,642,225 A   6/1997 Sato
(Continued)

FOREIGN PATENT DOCUMENTS

JP    6-201989 A    7/1994
JP    7-199123 A    8/1995
(Continued)

OTHER PUBLICATIONS

International Search Report from International Patent Application No. PCT/JP2013/003384, Jul. 16, 2013.

*Primary Examiner* — Joseph P Martinez
(74) *Attorney, Agent, or Firm* — Shapiro, Gabor and Rosenberger, PLLC

(57) ABSTRACT

Provided is a photographing lens (ML) including a first lens group (G1) having positive refractive power, a second lens group (G2) having negative refractive power, and a third lens group (G3) having positive refractive power, the photographing lens being configured such that the second lens group (G2) moves along the optical axis upon focusing from an object at infinity to an object at a finite distance. The first lens group (G1) includes a front lens group (G1a) and a rear lens group (G1b) having a longest air interval from the front lens group (G1a) in the first lens group (G1), and the second lens group (G2) includes a negative lens (L21) and a cemented lens in which a positive lens (22) and a negative lens (23) are cemented in order from the object.

9 Claims, 6 Drawing Sheets

(51) Int. Cl.
*G02B 15/173* (2006.01)
*G03B 19/12* (2006.01)

(56) References Cited

U.S. PATENT DOCUMENTS

| | | |
|---|---|---|
| 5,715,087 A | 2/1998 | Sato |
| 5,745,306 A | 4/1998 | Sato |
| 2005/0248857 A1 | 11/2005 | Wada |
| 2009/0190239 A1 | 7/2009 | Suzuki |

| | | |
|---|---|---|
| 2011/0080654 A1 | 4/2011 | Okumura |

FOREIGN PATENT DOCUMENTS

| | | |
|---|---|---|
| JP | 8-327897 A | 12/1996 |
| JP | 9-203859 A | 8/1997 |
| JP | 11-160617 A | 6/1999 |
| JP | 2005-321574 A | 11/2005 |
| JP | 2009-180827 A | 8/2009 |
| JP | 2011-81064 A | 4/2011 |

\* cited by examiner

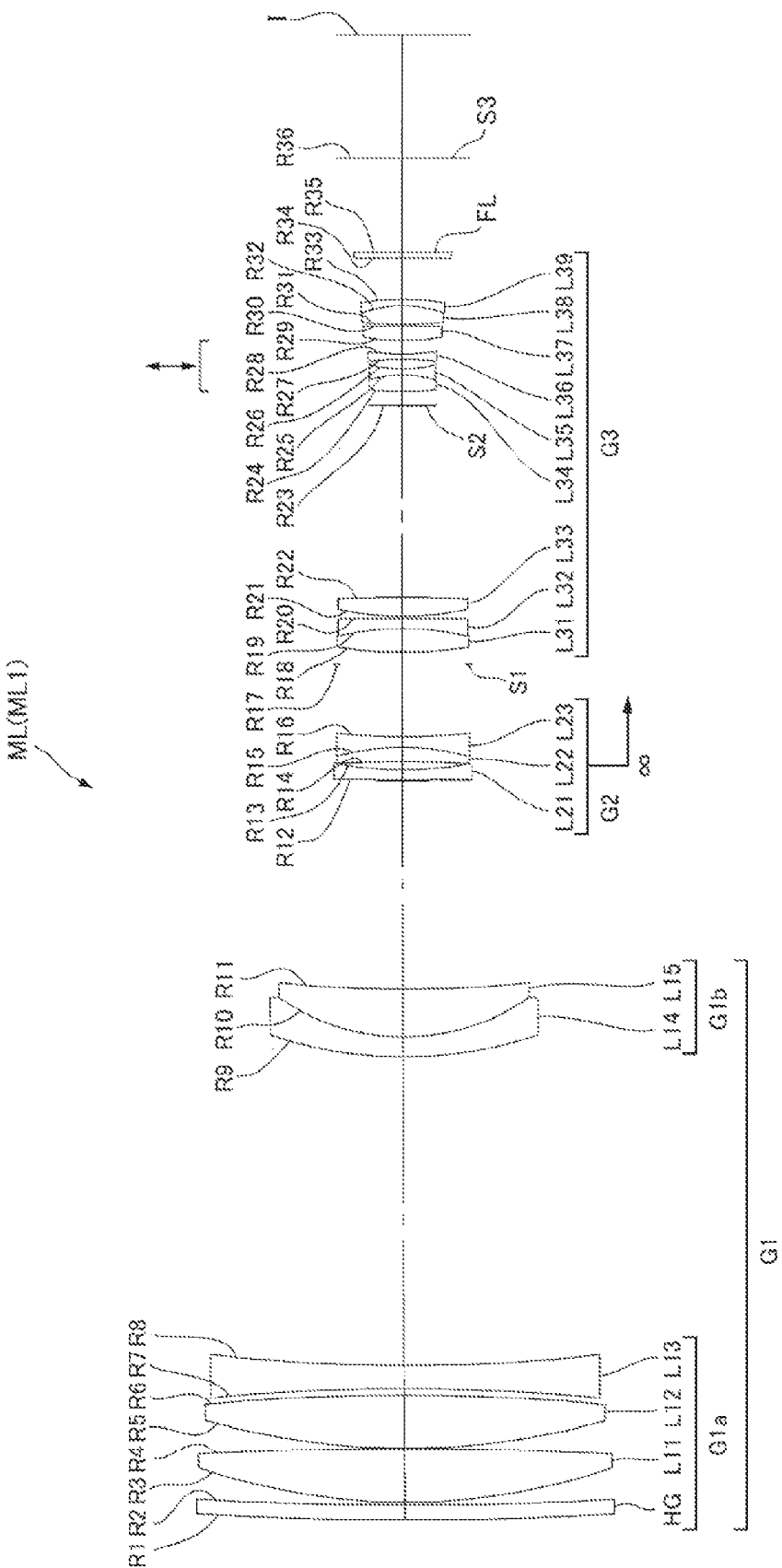

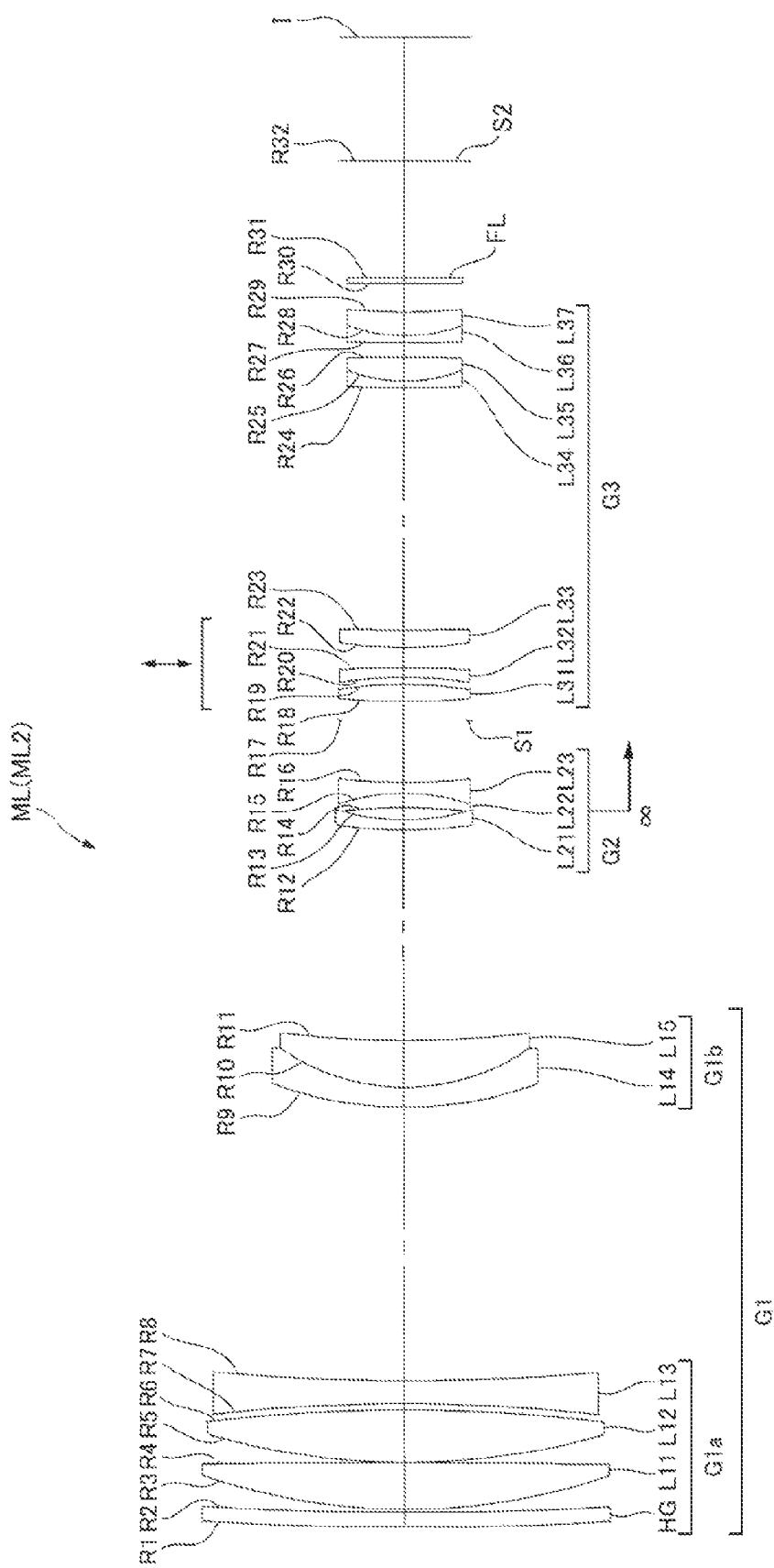

COMA ABERRATION

PHOTOGRAPHING LENS, OPTICAL APPARATUS AND METHOD FOR MANUFACTURING THE PHOTOGRAPHING LENS

This is a continuation of PCT International Application No. PCT/JP2013/003384, filed on May 29, 2013, which is hereby incorporated by reference. This application also claims the benefit of Japanese Patent Application No. 2012-122709, filed in Japan on May 30, 2012, which is hereby incorporated by reference.

TECHNICAL FIELD

The present invention relates to a photographing lens, an optical apparatus having the photographing lens, and a method for manufacturing the photographing lens.

TECHNICAL BACKGROUND

Photographing lenses suitable for photographing cameras, electronic still cameras and video cameras have been proposed. Among the photographing lenses, an inner focus type telephoto lens is often used as a lens that has a long focal length yet is compact and has good image forming performance, and can be mechanically configured (e.g. see Patent Document 1 and Patent Document 2).

PRIOR ARTS LIST

Patent Documents

Patent Document 1: Japanese Laid-Open Patent Publication No. 2009-180827(A)

Patent Document 2: Japanese Laid-Open Patent Publication No. H11-160617 (A)

SUMMARY OF THE INVENTION

Problems to be Solved by the Invention

However an even smaller size and lighter weight are demanded for such photographing lenses.

With the foregoing in view, it is an object of the present invention to provide a photographing lens that is compact and light, and has good image forming performance, an optical apparatus having this photographing lens, and a method for manufacturing the photographing lens.

Means to Solve the Problems

To achieve this object, a photographing lens according to the present invention has, in order from an object: a first lens group having positive refractive power; a second lens group having negative refractive power; and a third lens group having positive refractive power. The photographing lens is configured such that the second lens group moves along an optical axis upon focusing from an object at infinity to an object at a finite distance, the first lens group includes, in order from the object, a front lens group and a rear lens group having a longest air interval from the front lens group in the first lens group, the second lens group includes, in order from the object, a negative lens and a cemented lens in which a positive lens and a negative lens are cemented in order from the object, and the following conditional expressions are satisfied.

$(-f1an)/f1 > 1.35$ $v1bp - v1bn < 32.0$ $Rm/f2 > 0.78$ $v2n - v2p < 30.0$ where f1 denotes a focal length of the first lens group, f2 denotes a focal length of the second lens group, f1an denotes a focal length of a negative lens of which focal length is shortest in the front lens group, v1bp denotes an Abbe number of a positive lens of which Abbe number is largest in the rear lens group, v1bn denotes an Abbe number of a negative lens of which Abbe number is smallest in the rear lens group, Rm denotes a radius of curvature of a cemented surface of the cemented lens of the second lens group, v2p denotes an Abbe number of a positive lens of which Abbe number is smallest in the second lens group, and v2n denotes an Abbe number of a negative lens of which Abbe number is largest in the second lens group.

In this photographing lens, it is preferable that at least one lens of the third lens group is movably disposed so as to have a component perpendicular to the optical axis.

In this photographing lens, it is preferable that the front lens group includes, in order from the object, two positive lenses and one negative lens.

In this photographing lens, it is preferable that the rear lens group is constituted by a cemented lens in which a negative lens and a positive lens are cemented in order from the object.

In this photographing lens, it is preferable that the following conditional expression is satisfied.

$D1ab/D1 > 0.40$ where D1 denotes a length of the first lens group, and D1ab denotes an air interval between the front lens group and the rear lens group.

In this photographing lens, it is preferable that the following conditional expression is satisfied.

$S1p < 3.50$ where S1p denotes a specific gravity of at least one positive lens of the front lens group.

In this photographing lens, it is preferable that the following conditional expression is satisfied.

$S1n < 4.50$ where S1n denotes a specific gravity of at least one negative lens of the front lens group.

An optical apparatus according to the present invention is an optical apparatus having a photographing lens that forms an image of an object on a predetermined surface, and the photographing lens according to the present invention is used as the photographing lens.

A method for manufacturing a photographing lens according to the present invention includes steps of: configuring a first lens group that has positive refractive power and includes, in order from an object, a front lens group and a rear lens group having a longest air interval from the front lens group in the first lens group; configuring a second lens group that has negative refractive power and includes, in order from the object, a negative lens and a cemented lens in which a positive lens and a negative lens are cemented in order from the object; and arranging the first lens group, the second lens group and a third lens group having positive refractive power, in order from the object. The photography lens is configured such that the second lens group moves along an optical axis upon focusing from an object at infinity to an object at a finite distance, and the following conditional expressions are satisfied.

$(-f1an)/f1 > 1.35$ $v1bp - v1bn < 32.0$ $Rm/f2 > 0.78$ $v2n - v2p < 30.0$ where f1 denotes a focal length of the first lens group, f2 denotes a focal length of the second lens group, f1an denotes a focal length of a negative lens of which focal length is shortest in the front lens group, ν1bp denotes an Abbe number of a positive lens of which Abbe number is largest in the rear lens group, ν1bn denotes an Abbe number of a negative lens of which Abbe number is smallest in the rear lens group, Rm denotes a radius of curvature of a cemented surface of the cemented lens of the second lens group, ν2p denotes an Abbe number of a positive lens of which Abbe number is smallest in the second lens group, and ν2n denotes an Abbe number of a negative lens of which Abbe number is largest in the second lens group.

Advantageous Effects of the Invention

According to this invention, compactness, light weight and good image forming performance can be implemented.

BRIEF DESCRIPTION OF THE DRAWINGS

FIG. 1 is a diagram depicting a lens configuration of a photographing lens according to Example 1 in the state of focusing on infinity.

FIG. 3 is a diagram depicting a lens configuration of a photographing lens according to Example 2 in the state of focusing on infinity.

INSCRIPTION OF THE EMBODIMENTS

Figure 5:
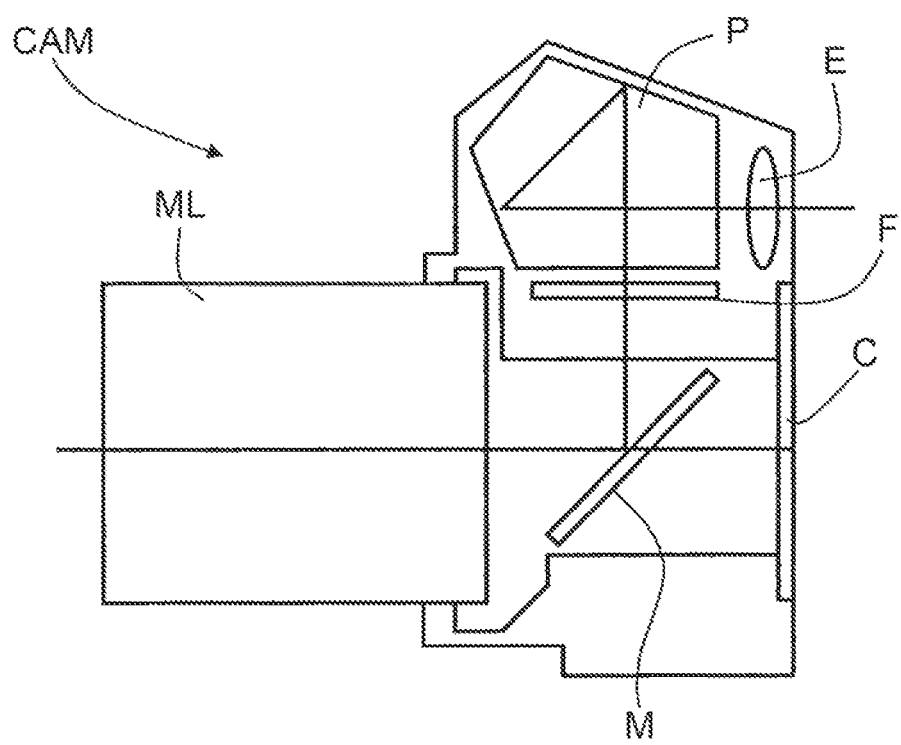
FIG. 5 is a cross-sectional view depicting a digital single lens reflex camera.

Preferred embodiments of the present invention will now be described with reference to the drawings. FIG. 5 shows a digital single lens reflex camera CAM having a photographing lens ML according to the present invention. In the digital single lens reflex camera CAM in FIG. 5, the light from an object (not illustrated) is collected by the photographing lens ML, and forms an image on a focal plane plate F via a quick return mirror M. The light that formed this image on the focal plane plate F is reflected a plurality of times in the penta prism F and is guided to an eyepiece E. Thereby the user can observe the image of the object as an erected image through the eyepiece E.

If the user presses a release button (not illustrated), the quick return mirror M is retracted out of the optical path, and the light from the object collected by the photographing lens ML forms an image of the object on a picture element C. Thereby the light from the object forms an image on the picture element C, and the picture element C captures the image, which is recorded in memory (not illustrated) as an image of the object. Thus the user can photograph the object using the digital single lens reflex camera CAM. An effect similar to this camera CAM can also be implemented even by a camera that does not include the quick return mirror M. The digital single lens reflex camera CAM in FIG. 5 may hold a removable photographing lens ML or may be integrated with the photographing lens ML.

As illustrated in FIG. 1, the photographing lens ML has, in order from an object, a first lens group G1 having positive refractive power, a second lens group G2 having negative refractive power, and a third lens group G3 having positive refractive power. By this configuration, both compactness and high performance can be implemented even if the focal length is long. The second lens group G2 moves along the optical axis upon focusing from an object at infinity to an object at a short distance (finite distance).

The first lens group G1 includes, in order from the object, a front lens group G1a and a rear lens group G1b having a longest air interval from the front lens group in the first lens group G1. By separating the first lens group G1 into the front lens group G1a and the rear lens group G1b with the longest air interval therebetween, the focal length of the first lens group G1 can be appropriately short. As a result, the lens diameter of the second lens group G2 can be decreased, and the moving distance of the second lens group G2 upon focusing at a short distance can be shorter. Therefore the second lens group G2 (focusing lens group) can be driven by a relatively compact motor unit.

The second lens group G2 includes, in order from the object, a negative lens and a cemented lens in which a positive lens and a negative lens are cemented in order from the object. By this configuration, spherical aberration, curvature of field, Chromatic aberration or the like upon focusing at a short distance can be satisfactorily corrected.

In the photographing lens ML having this configuration, it is preferable that the following conditional expressions (1) to (4) are satisfied in order to implement compactness and light weight while maintaining good image forming performance.

$$(-f1an)/f1 > 1.35 \tag{1}$$

$$\nu 1bp - \nu 1bn < 32.0 \tag{2}$$

$$Rm/f2 > 0.78 \tag{3}$$

$$\nu 2n - \nu 2p < 30.0 \tag{4}$$

where f1 denotes a focal length of the first lens group G1, f2 denotes a focal length of the second lens group G2, f1an denotes a focal length of a negative lens of which focal length is shortest in the front lens group G1a, ν1bp denotes an Abbe number of a positive lens of which Abbe number is largest in the rear lens group G1b, ν1bn denotes an the number of a negative lens of which Abbe number is smallest in the rear lens group G1b, Rm denotes a radius of curvature of a cemented surface of the cemented lens of the second lens group G2, ν2p denotes an Abbe number of a positive lens of which Abbe number is smallest in the second lens group G2, and ν2n denotes an Abbe number of a negative lens of which Abbe number is largest in the second lens group G2.

The conditional expression (1) specifies the ratio of the focal length f1an of the negative lens of which focal length is shortest in the front lens group G1a, with respect to the focal length f1 of the first lens group G1. If the lower limit value of the conditional expression (1) is not reached, the focal length f1an of the negative lens becomes short, hence the radius of curvature of each lens surface of this negative lens becomes small, which increases the edge thickness of the lens and increases the weight. If a glass with low specific gravity is used, for example, to decrease the weight, the refractive index decreases, which makes it difficult to correct curvature of field.

To demonstrate the effect of this embodiment with certainty, it is preferable that the lower limit value of the conditional expression (1) is 1.40.

The conditional expression (2) specifies the difference between the Abbe number ν1bp of the positive lens of which Abbe number is largest in the rear lens group G1b, and the Abbe number ν1bn of the negative lens of which Abbe number is smallest in the rear lens group G1b. If the upper limit value of the conditional expression (2) is exceeded, correction of Chromatic aberration, particularly of the secondary spectrum, becomes difficult.

To demonstrate the effect of this embodiment with certainty, it is preferable that the upper limit value of the conditional expression (2) is 30.0.

The conditional expression (3) specifies the ratio of the radius of curvature Rm of the cemented surface of the cemented lens of the second lens group G2, with respect to the focal length f2 of the second lens group G2. If the lower limit value of the conditional expression (3) is not reached, the radius of curvature Rm of the cemented surface becomes small, which makes it difficult to correct the curvature of field upon focusing at a short distance.

To demonstrate the effect of this embodiment with certainty, it is preferable that the lower limit value of the conditional expression (3) is 0.80.

The conditional expression (4) specifies the difference between the Abbe number ν2p of the positive lens of which Abbe number is smallest in the second lens group G2, and the Abbe number ν2n of the negative lens of which Abbe number is largest in the second lens group G2. If the upper limit value of the conditional expression (4) is exceeded, correction of Chromatic aberration, particularly of the secondary spectrum, becomes difficult.

To demonstrate the effect of this embodiment with certainty, it is preferable that the upper limit value of the conditional expression (4) is 26.0.

In this photographing lens ML, it is preferable that at least one lens of the third lens group G3 is movably disposed so as to have a component perpendicular to the optical axis. By this, the shift of the optical axis caused by vibration due to camera shake, for example, can be corrected, and image forming performance can be corrected to the level where practically no problems occur.

In this photographing lens ML, it is preferable that the front lens group G1a of the first lens group G1 includes, in order from the object, two positive lenses and one negative lens. By this, Chromatic Aberration and spherical aberration can be satisfactorily corrected while implementing compactness and light weight.

In this photographing lens ML, it is preferable that the rear lens group G1b of the first lens group G1 is constituted by a cemented lens in which a negative lens and a positive lens are cemented in order from the object. By this, coma aberration and spherical aberration can be satisfactorily corrected upon focusing at a short distance.

In this photographing lens ML, it is preferable that the following conditional expression (5) is satisfied.

$$D1ab/D1 > 0.40 \tag{5}$$

where D1 denotes a length of the first lens group G1, and D1ab denotes an air interval between the front lens group G1a and the rear lens group G1b.

The conditional expression (5) specifies the ratio of the length D1 of the first lens group G1 and the air interval D1ab between the front lens group G1a and the rear lens group G1b. If the lower limit value of the conditional expression (5) is not reached, the rear lens group G1b becomes larger and weight increases. To decrease the weight, if the glass used for the negative lens of the rear lens group G1b is replaced with a material having lower specific gravity, for example, then the refractive index decreases, which makes it difficult to correct curvature of field.

To demonstrate the effect of this embodiment with certainty, it is preferable that the lower limit value of the conditional expression (5) is 0.50.

In this photographing lens ML, it is preferable that the following conditional expression (6) is satisfied.

$$S1p < 3.50 \tag{6}$$

where S1p denotes a specific gravity of at least one positive lens of the front lens group G1a.

The conditional expression (6) specifies a specific gravity S1p of at least one positive lens of the front lens group G1a. The specific gravity in this embodiment is a specific gravity when the standard material is water at 4° C. If the upper limit value of the conditional expression (6) is exceeded, weight increases. To decrease the weight, if the glass used for the negative lens of the front lens group G1a is replaced with a material having lower specific gravity, for example, then the refractive index decreases, which makes it difficult to correct curvature of field.

To demonstrate the effect of this embodiment with certainty, it is preferable that the upper limit value of the conditional expression (6) is 3.30.

In this photographing lens ML, it is preferable that the following conditional expression (7) is satisfied.

$$S1n < 4.50 \tag{7}$$

where S1n denotes a specific gravity of at least one negative lens of the front lens group G1a.

The conditional expression (7) specifies a specific gravity S1n of at least one negative lens of the front lens group G1a. If the upper limit value of the conditional expression (7) is exceeded, weight increases. To decrease the weight, if volume is decreased by increasing the radius of curvature of the negative lens of the front lens group G1a, for example, high dispersion lens material must be used, which makes it difficult to correct chromatic aberration, particularly of the secondary spectrum.

To demonstrate the effect of this embodiment with certainty, it is preferable that the upper limit value of the conditional expression (7) is 4.00.

It is preferable that the lower limit value of the conditional expression (7) is 3.00. If this lower limit value is not reached, a lens material of which refractive index is relatively all must be used, which makes it difficult to correct curvature of field. To demonstrate the effect of this embodiment with certainty, it is preferable that the lower limit value of the conditional expression (7) is 3.50.

According to this embodiment, a photographing lens ML that is compact and light and has good image forming performance, and an optical apparatus (digital single lens reflex camera CAM) having this photographing lens ML can be provided.

Figure 6:
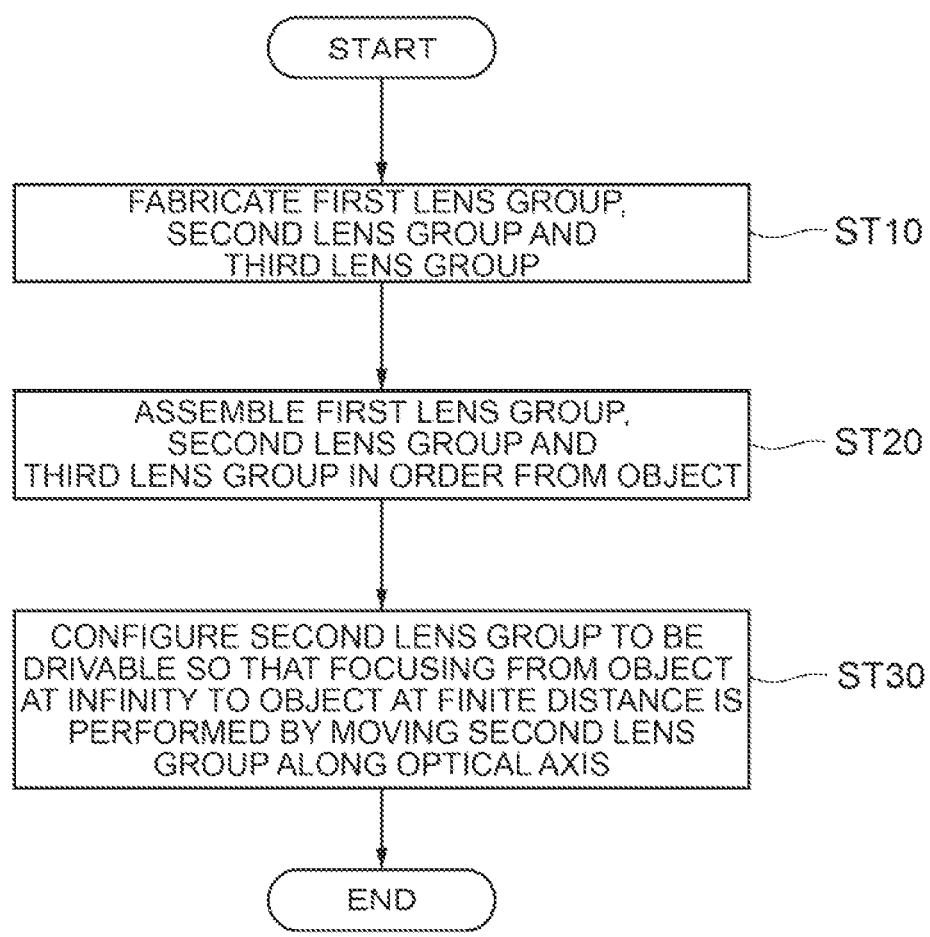
FIG. 6 is a flow chart depicting a method for manufacturing the photographing lens.

Now a method for manufacturing the photographing lens ML having the above mentioned configuration will be described with reference to FIG. 6. First, the first lens group G1 having positive refractive power, the second lens group G2 having negative refractive power, and the third lens group G3 having positive refractive power, are fabricated (step ST10). In this case, the first lens group G1, constituted by the front lens group G1a and the rear lens group G1b described above, is fabricated. Further, the second lens group G2, that includes the negative lens and the cemented lens described above, is fabricated.

Then the first lens group G1, the second lens group G2 and the third lens group G3 are assembled in a cylindrical lens barrel in order from the object (step S120). Then the second lens group G2 is configured to be drivable so that focusing from an object at infinity to an object at finite distance is performed by moving the second lens group G2 along the optical axis (step ST30). In steps ST10 to ST30, the conditional expressions (1) to (4) are satisfied. According to this manufacturing method, a photographing lens ML, which is compact and light and has good image forming performance, can be implemented.

EXAMPLES

Example 1

Each example of the present invention will now be described with reference to the accompanying drawings. First, Example 1 will be described with reference to FIG. 1, FIG. 2 and Table 1. FIG. 1 shows a configuration of a photographing lens ML (ML1) according to Example 1. The photographing lens ML1 according to Example 1 has, in order from an object, a first lens group G1 having positive refractive power, a second lens group G2 having negative refractive power, an aperture stop S1, and a third lens group G3 having positive refractive power. Upon focusing from an object at infinity to an object at a short distance (finite distance), the second lens group G2 moves toward the image plane I along the optical axis.

The first lens group G1 includes, in order from the object, a front lens group G1a having positive refractive power, and a rear lens group G1b having positive refractive power which has a longest air interval from the front lens group G1a in the first lens group G1. The front lens group G1a of the first lens group G1 includes a protective filter glass HG having a convex surface facing the object, a first positive lens L11 in a biconvex form, a second positive lens L12 in a biconvex form, and a negative lens L13 in a biconcave form. The rear lens group G1b of the first lens group G1 includes a cemented lens in which a negative lens L14 in a meniscus form having a convex surface facing the object and a positive lens L15 in a meniscus form having a convex surface facing the object are cemented in order from the object.

The second lens group G2 includes, in order from the object, a first negative lens L21 in a meniscus form having a convex surface facing the object, and a cemented lens in which a positive lens L22 in a meniscus form having a concave surface facing the object and a second negative lens L23 in a biconcave form are cemented in order from the object.

The third lens group G3 includes, in order from the object: a cemented lens in which a first positive lens L31 in a biconvex form and a first negative lens L32 in a meniscus form having a concave surface facing the object are cemented; a second positive lens L33 in a biconvex form; a cemented lens in which a third positive lens L34 in a biconvex form and a second negative lens L35 in a biconcave form are cemented; a third negative lens L36 in a biconcave form; a fourth positive lens L37 in a biconvex form; and a cemented lens in which a fifth positive lens L38 in a biconvex form and a fourth negative lens L39 in a meniscus form having a concave surface facing the object are cemented. In the third lens group G3, the cemented lens of the third positive lens L34 and the second negative lens L35, and the third negative lens L36 can be moved in a direction virtually perpendicular to the optical axis, whereby fluctuation of an image position, caused by vibration of the optical system, can be corrected.

A first flare-cut diaphragm S2 is disposed in the third lens group G3. Further, a removable optical filter FL and a second flare-cut diaphragm S3 are disposed between the third lens group G3 and the image plane I. For the removable optical filter FL, an NC filter (neutral color filter), a color filter, a polarizing filter, an ND filter (neutral density filter), an IR filter (infrared cut-off filter or the like can be used.

Table 1 and Table 2 show each data value of the photographing lenses according to Example 1 and Example 2 respectively. In [Element Data] in each table, f denotes a focal length of the photographing lens, FNO denotes an F number, ω denotes a half angle of view (maximum incident angle: unit is "°"), Y denotes an image height with respect to the half angle of view, and TL denotes total lens length (air conversion). In [Lens Data], the surface number is a sequential number of each lens surface counted from the object side, R denotes the radius of curvature of each lens surface, D denotes a distance from each lens surface to the next lens surface, vd denotes an Abbe number at the d-line (wavelength λ: 587.6 nm), nd denotes a refractive index at the d-line (wavelength λ: 587.6 nm), d11 and d16 denotes variable surface distances and BF denotes back focus. The radius of curvature "0.00000" indicates a plane, and the refractive index of air nd=1.00000 is omitted.

In [Variable Distance Data], f denotes a focal length of the photographing lens, and β denotes a photographing magnification. [Variable Distance Data] shows a value of the distance D0 from the object to the first lens surface, values of each variable distance d11 and d16, and a value of back focus BF (air conversion) that correspond to each focal length and photographing magnification. In [Conditional Expression Corresponding Value], a corresponding value of each conditional expression is shown respectively.

In all the data values herein below, "mm" is normally used as the unit of focal length f, radius of curvature R and other lengths, but the unit is not limited to "mm", since an equivalent optical performance is attained even if the optical system is proportionally expanded or proportionally reduced. The same reference symbols as this example are used in the data values of Example 2, which is described later.

Table 1 shows each data value of Example 1. The radius of curvature R of surface 1 to surface 36 in Table 1 correspond to reference symbols R1 to R36 attached to surface 1 to surface 36 in FIG. 1.

TABLE 1

[Element Data]

F = 776.0
FNO = 5.61
2ω = 3.15
Y = 21.60
TL = 505.07

[Lens Data]

| Surface number | R | D | nd | vd |
| --- | --- | --- | --- | --- |
| 1 | 1200.37040 | 5.000 | 1.516800 | 63.88 |
| 2 | 1199.78970 | 1.000 | | |
| 3 | 215.43740 | 18.300 | 1.433852 | 95.25 |
| 4 | −1324.26660 | 0.100 | | |
| 5 | 244.59720 | 18.000 | 1.433852 | 95.25 |
| 6 | −748.55470 | 2.141 | | |
| 7 | −718.52850 | 7.900 | 1.713000 | 53.96 |
| 8 | 565.06260 | 105.348 | | |

TABLE 1-continued

| | | | | |
|---|---|---|---|---|
| 9 | 141.60970 | 6.900 | 1.713000 | 53.96 |
| 10 | 75.54510 | 16.000 | 1.497820 | 82.57 |
| 11 | 423.05960 | d11 | | |
| 12 | 2495.65750 | 3.500 | 1.834810 | 42.73 |
| 13 | 119.74690 | 2.748 | | |
| 14 | −436.75640 | 5.000 | 1.805180 | 25.45 |
| 15 | −82.42540 | 3.500 | 1.719990 | 50.27 |
| 16 | 229.83910 | d16 | | |
| 17 | 0.00000 | 4.000 | | (aperture stop) |
| 18 | 133.37300 | 8.000 | 1.548140 | 45.51 |
| 19 | −107.86820 | 3.500 | 1.902000 | 25.27 |
| 20 | 26354.14300 | 0.705 | | |
| 21 | 99.07980 | 6.500 | 1.517420 | 52.20 |
| 22 | −420.22500 | 65.264 | | |
| 23 | 0.00000 | 5.000 | | (flare-cut diaphragm) |
| 24 | 118.63290 | 5.500 | 1.603420 | 38.03 |
| 25 | −42.33090 | 2.000 | 1.593190 | 67.90 |
| 26 | 46.10600 | 3.000 | | |
| 27 | −147.33360 | 2.000 | 1.729160 | 54.61 |
| 28 | 82.28840 | 4.500 | | |
| 29 | 74.37600 | 5.000 | 1.548140 | 45.51 |
| 30 | −844.30850 | 0.500 | | |
| 31 | 131.38200 | 6.500 | 1.603420 | 38.03 |
| 32 | −38.73450 | 2.000 | 1.950000 | 29.37 |
| 33 | −97.22150 | 14.210 | | |
| 34 | 0.00000 | 2.000 | 1.516800 | 63.88 |
| 35 | 0.00000 | 31.791 | | |
| 36 | 0.00000 | BF | | (flare-cut diaphragm) |

[Variable Distance Data]

| | Focusing on infinity f = 776.0 | Focusing at short distance β = −0.1543 |
|---|---|---|
| D0 | ∞ | 5294.9 |
| d11 | 71.00 | 88.93 |
| d16 | 24.66 | 6.73 |
| BF | 42.00 | 42.00 |

[Conditional Expression Corresponding Value]

Conditional Expression (1) (−f1an)/f1 = 1.47
Conditional Expression (2) ν1bp − ν1bn = 28.6
Conditional Expression (3) Rm/f2 = 0.89
Conditional Expression (4) ν2n − ν2p = 24.8
Conditional Expression (5) D1ab/D1 = 0.58
Conditional Expression (6) S1p = 3.18
Conditional Expression (7) S1n = 3.85

As the above data shows, all of the conditional expressions (1) to (7) are satisfied in this example.

Figure 2A:
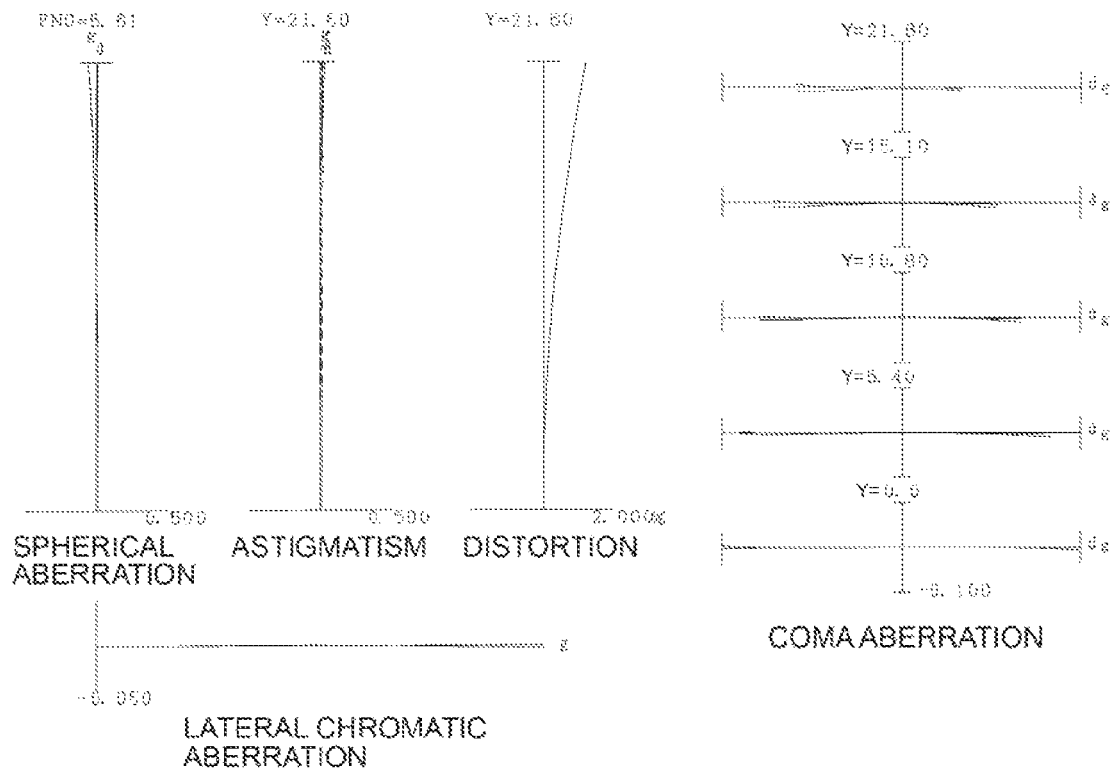
FIG. 2A is a set of graphs showing various aberrations of the photographing lens according to Example 1 in the state of focusing on infinity.
Figure 2B:
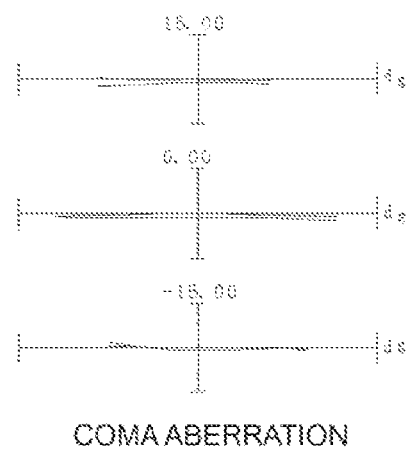
FIG. 2B is a set of graphs showing lateral aberrations after an image blur is corrected.

FIG. 2A is a set of graphs showing various aberrations of the photographing lens ML1 according to Example 1 upon focusing on infinity, and FIG. 2B is a set of graphs showing lateral aberrations after an image blur is corrected. In each graph showing aberrations, FNO denotes an F number, and Y denotes an image height at a half angle of view. In each graph showing aberrations, d indicates aberration at the d-line (λ=587.6 nm), and g indicates aberration at the g-line (λ=435.8 nm). In the graph showing astigmatism, the solid line indicates the sagittal image surface, and the broken line indicates the meridional image surface. This description on the graphs showing aberrations is the same as for the other example.

As each graph showing aberrations clarifies, in Example 1, various aberrations are satisfactorily corrected, demonstrating excellent image forming performance. Therefore a digital single lens reflex camera CAM, that includes the photographing lens ML1 of Example 1, can also demonstrate excellent optical performance.

Example 2

Example 2 will be described with reference to FIG. 3, FIG. 4 and Table 2. FIG. 3 shows a configuration of a photographing lens ML (ML2) according to Example 2 upon focusing on infinity. A photographing lens ML2 according to Example 2 has, in order from an object, a first lens group G1 having positive refractive power, a second lens group G2 having negative refractive power, an aperture stop S1, and a third lens group G3 having positive refractive power. Upon focusing from an object at infinity to an object at a short distance (finite distance), the second lens group G2 moves toward the image plane I along the optical axis.

The first lens group G1 includes, in order from the object, a front lens group G1a having positive refractive power, and a rear lens group G1b having positive refractive power which has a longest air interval from the front lens group G1a in the first lens group G1. The front lens group G1a of the first lens group G1 includes a protective filter glass HG having a convex surface facing the object, a first positive lens L11 in a biconvex form, a second positive lens L12 in a biconvex form, and a negative lens L13 in a biconcave form. The rear lens group G1b of the first lens group G1 includes a cemented lens in which a negative lens L14 in a meniscus form having a convex surface facing the object and a positive lens L15 in a meniscus form having a convex surface facing the object are cemented in order from the object.

The second lens group G2 includes, in order from the object, a first negative lens 121 in a meniscus form having a convex surface facing the object, and a cemented lens in which a positive lens 122 in a meniscus form having a concave surface facing the object and a second negative lens 123 in a biconcave form are cemented in order from the object.

The third lens group G3 includes, in order from the object: a first positive lens 131 in a biconvex form; a first negative lens L32 in a meniscus form having a concave surface facing the object; a second positive lens L33 in a meniscus form having a convex surface facing the object; a cemented lens in which a second negative lens 134 in a meniscus form having a convex surface facing the object and a third positive lens L35 in a biconvex form are cemented; and a cemented lens in which a third negative lens 136 in a meniscus form having a convex surface facing the object and a fourth positive lens 137 in a meniscus form having a convex surface facing the object are cemented. In the third lens group G3, the first positive lens 131, the first negative lens 132 and the second positive lens L33 can be moved in a direction virtually perpendicular to the optical axis, whereby fluctuation of the image position, caused by vibration of the optical system can be corrected.

A removable optical filter FL and a flare-cut diaphragm S2 are disposed between the third lens group G3 and the image plane I. For the removable optical filter FL, an NC filter (neutral color filter), a color filter, a polarizing filter, an ND filter (neutral density filter), an IR filter (infrared cut-off filter) or the like can be used.

Table 2 shows each data value of Example 2. The radius of curvature R of surface 1 to surface 32 in Table 2 correspond to reference symbols R1 to P32 attached to surface 1 to surface 32 in FIG. 3.

TABLE 2

[Element Data]

f = 776.0
FNO = 5.66
2ω = 3.17

TABLE 2-continued

Y = 21.60
TL = 510.03

[Lens Data]

| Surface number | R | D | nd | vd |
|---|---|---|---|---|
| 1 | 1200.37040 | 5.000 | 1.516800 | 63.88 |
| 2 | 1199.78970 | 1.000 | | |
| 3 | 211.93680 | 16.000 | 1.433852 | 95.25 |
| 4 | −6961.87300 | 0.100 | | |
| 5 | 239.37240 | 18.000 | 1.433852 | 95.25 |
| 6 | −564.39450 | 2.141 | | |
| 7 | −602.57570 | 7.900 | 1.713000 | 53.96 |
| 8 | 727.62630 | 93.889 | | |
| 9 | 130.09840 | 6.900 | 1.713000 | 53.96 |
| 10 | 74.02100 | 16.000 | 1.497820 | 82.57 |
| 11 | 342.63630 | d11 | | |
| 12 | 148.27840 | 3.500 | 1.795000 | 45.31 |
| 13 | 75.82600 | 4.314 | | |
| 14 | −211.93030 | 5.000 | 1.795040 | 28.69 |
| 15 | −70.55380 | 3.500 | 1.717000 | 47.97 |
| 16 | 196.03220 | d16 | | |
| 17 | 0.00000 | 6.600 | | (aperture stop) |
| 18 | 236.47740 | 6.000 | 1.548140 | 45.51 |
| 19 | −145.94770 | 2.500 | | |
| 20 | −143.37060 | 3.000 | 1.846660 | 23.80 |
| 21 | −374.15190 | 7.000 | | |
| 22 | 142.85380 | 6.000 | 1.518230 | 58.82 |
| 23 | 1037.90390 | 82.898 | | |
| 24 | 349.94570 | 2.400 | 1.902650 | 35.72 |
| 25 | 55.90950 | 8.000 | 1.620041 | 36.26 |
| 26 | −1342.21780 | 5.000 | | |
| 27 | 734.39130 | 2.500 | 1.593190 | 67.90 |
| 28 | 61.49180 | 8.000 | 1.698947 | 30.13 |
| 29 | 192.90290 | 10.000 | | |
| 30 | 0.00000 | 2.000 | 1.516800 | 63.88 |
| 31 | 0.00000 | 40.000 | | |
| 32 | 0.00000 | BF | | (flare-cut diaphragm) |

[Variable Distance Data]

| | Focusing on infinity f = 776.0 | Focusing at short distance β = −0.1540 |
|---|---|---|
| D0 | ∞ | 5290.0 |
| d11 | 71.84 | 87.77 |
| d16 | 21.05 | 5.12 |
| BF | 42.00 | 42.00 |

[Conditional Expression Corresponding Value]

Conditional Expression (1) (−f1an)/f1 = 1.63
Conditional Expression (2) ν1bp − ν1bn = 28.6
Conditional Expression (3) Rm/f2 = 0.81
Conditional Expression (4) ν2n − ν2p = 16.6
Conditional Expression (5) D1ab/D1 = 0.56
Conditional Expression (6) S1p = 3.18
Conditional Expression (7) S1n = 3.85

As the above data shows, all of the conditional expressions (1) to (7) are satisfied in this example.

Figure 4A:
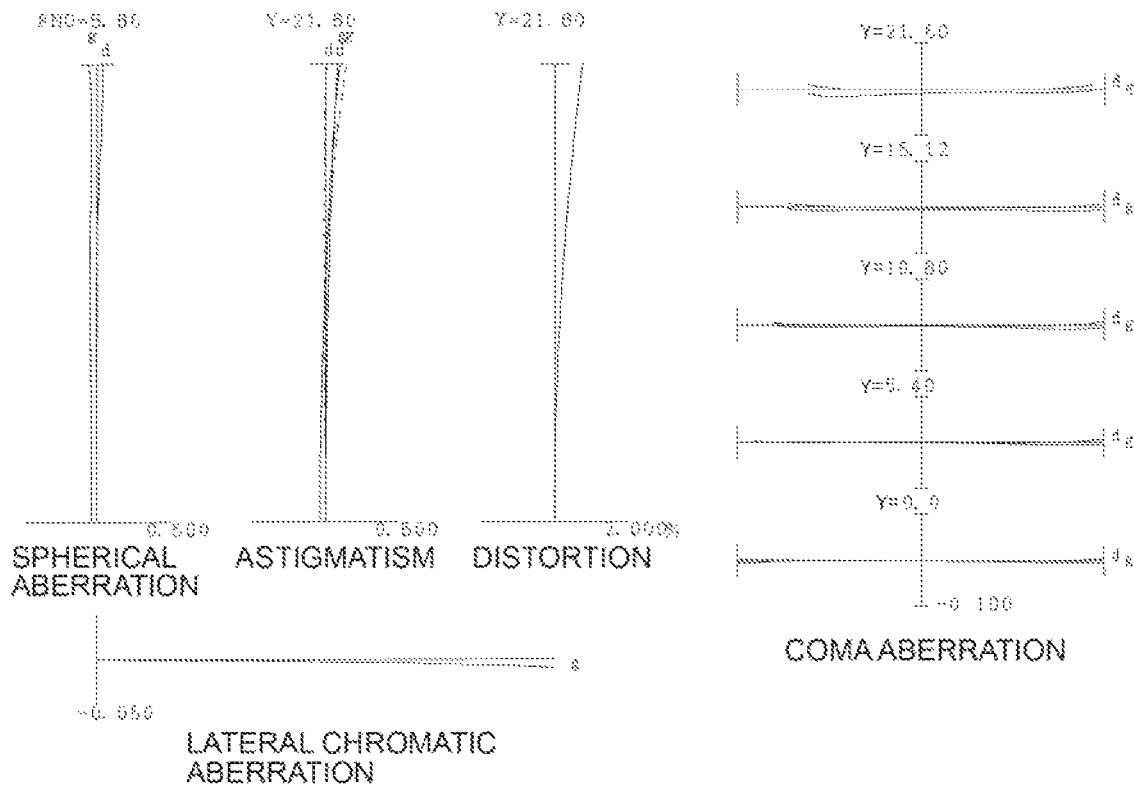
FIG. 4A is a set of graphs showing various aberrations of the photographing lens according to Example 2 in the state of focusing on infinity.
Figure 4B:
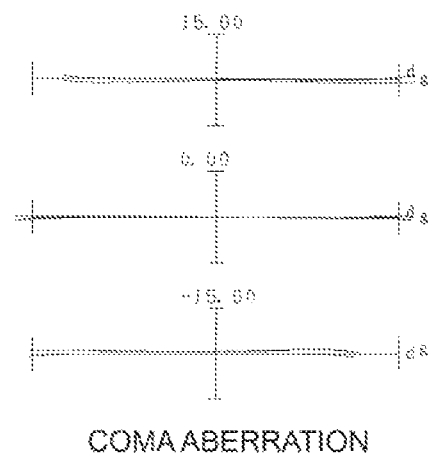
FIG. 4B is a set of graphs showing lateral aberrations after an image blur is corrected.

FIG. 4A is a set of graphs showing various aberrations of the photographing lens ML2 according to Example 2 upon focusing on infinity, and FIG. 4B is a set of graphs showing lateral aberrations after an image blur is corrected. As each graph showing aberrations clarifies, in Example 2, various aberrations are satisfactorily corrected, demonstrating excellent image forming performance. Therefore a digital single lens reflex camera CAM, that includes the photographing lens ML2 of Example 2 can also demonstrate excellent optical performance.

As described above, according to each example, a photographing lens ML and an optical apparatus (digital single lens reflex camera CAM) that are compact and light and has good image forming performance can be implemented.

In the above embodiment, the following content can be adapted within a range where the optical performance is not diminished.

In each example, a photographing lens is constituted by three lens groups, but the present invention can also be applied to a configuration using a different number of lens groups, such as four lens groups. In the configuration, a lens or a lens group may be added to the side closest to the object, or a lens or a lens group may be added to the side closest to the image. A "lens group" refers to a portion having at least one lens isolated by an air interval which changes upon zooming.

A single or a plurality of lens group(s) or a partial lens group may be designed to be a focusing lens group, which performs focusing from an object at infinity to an object at a short distance by moving in the optical axis direction. This focusing lens group can be applied to auto focusing, and is also suitable for driving a motor for auto focusing (driving using an ultrasonic motor or the like). It is particularly preferable that the second lens group is designed to be a focusing lens group.

Further, a lens group or a partial lens group may be designed to be a vibration-isolating lens group, which corrects image blurs generated by camera shake by moving the lens group or the partial lens group so as to have a component in a direction perpendicular to the optical axis, or by rotating (oscillating) the lens group or the partial lens group in an in-plane direction including the optical axis. It is particularly preferable that at least a part of the third lens group is designed to be a vibration-isolating lens group.

The lens surface may be formed to be a spherical surface, a plane, or an aspherical surface. If the lens surface is spherical or a plane, lens processing and assembly adjustment are easy, and deterioration of optical performance due to an error in processing and assembly adjustment can be prevented. The spherical or plane lens surface is preferable since the image quality does not change very much even if the image plane is shifted. If the lens surface is aspherical, the aspherical surface can be any of: an aspherical surface generated by grinding; a glass-molded aspherical surface generated by forming glass in an aspherical shape using a die; and a composite aspherical surface generated by forming resin on the surface of the glass so as to be an aspherical shape. The lens surface may be a diffraction surface, and the lens may be a refractive index distributed lens (GRIN lens) or a plastic lens.

It is preferable that the aperture stop is disposed near or inside the third lens group, but the role of the aperture stop may be substituted by the frame of the lens, without disposing a separate element as the aperture stop.

Each lens surface may be coated with an antireflection which has high transmittance in a wide wavelength range, in order to decrease ghosts and flares, and implement a high optical performance at high contrast.

EXPLANATION OF NUMERALS AND CHARACTERS

CAM digital single lens reflex camera (optical apparatus)
ML photographing lens
G1 first lens group
G1a front lens group
G1b rear lens group
G2 second lens group
G3 third lens group
S1 aperture stop
I image plane

The invention claimed is:

1. A photographing lens comprising, in order from an object:
a first lens group having positive refractive power;
a second lens group having negative refractive power; and
a third lens group having positive refractive power,
the photographing lens being configured such that the second lens group moves along an optical axis upon focusing from an object at infinity to an object at a finite distance,
the first lens group including, in order from the object, a front lens group and a rear lens group, an air interval between the front lens group and the rear lens group being a longest air interval in the first lens group,
the second lens group including, in order from the object, a negative lens and a cemented lens in which a positive lens and a negative lens are cemented in order from the object, and
the following conditional expressions being satisfied:

$$(-f1an)/f1 > 1.35$$

$$v1bp - v1bn < 32.0$$

$$Rm/f2 > 0.78$$

$$v2n - v2p \leq 24.8$$

where f1 denotes a focal length of the first lens group, f2 denotes a focal length of the second lens group, f1an denotes a focal length of a negative lens of which focal length is shortest in the front lens group, v1bp denotes an Abbe number of a positive lens of which Abbe number is largest in the rear lens group, v1bn denotes an Abbe number of a negative lens of which Abbe number is smallest in the rear lens group, Rm denotes a radius of curvature of a cemented surface of the cemented lens of the second lens group, v2p denotes an Abbe number of a positive lens of which Abbe number is smallest in the second lens group, and v2n denotes an Abbe number of a negative lens of which Abbe number is largest in the second lens group.

2. The photographing lens according to claim 1, wherein at least one lens of the third lens group is movably disposed so as to have a movement component perpendicular to the optical axis.

3. The photographing lens according to claim 1, wherein the front lens group includes, in order from the object, two positive lenses and one negative lens.

4. The photographing lens according to claim 1, wherein the rear lens group is constituted by a cemented lens in which a negative lens and a positive lens are cemented in order from the object.

5. The photographing lens according to claim 1, wherein the following conditional expression is satisfied:

$$D1ab/D1 > 0.40$$

where D1 denotes a length of the first lens group, and D1ab denotes an air interval between the front lens group and the rear lens group.

6. The photographing lens according to claim 1, wherein the following conditional expression is satisfied:

$$S1p < 3.50$$

where S1p denotes a specific gravity of at least one positive lens of the front lens group.

7. The photographing lens according to claim 1, wherein the following conditional expression is satisfied:

$$S1n < 4.50$$

where S1n denotes a specific gravity of at least one negative lens of the front lens group.

8. An optical apparatus comprising a photographing lens that forms an image of an object on a predetermined surface, the photographing lens being the photographing lens according to claim 1.

9. A method for manufacturing a photographing lens comprising the steps of:
configuring a first lens group that has positive refractive power and includes, in order from an object, a front lens group and a rear lens group, an air interval between the front lens group and the rear lens group being a longest air interval in the first lens group;
configuring a second lens group that has negative refractive power and includes, in order from the object, a negative lens and a cemented lens in which a positive lens and a negative lens are cemented in order from the object; and
arranging the first lens group, the second lens group and a third lens group having positive refractive power, in order from the object,
the second lens group moving along an optical axis upon focusing from an object at infinity to an object at a finite distance, and
the following conditional expressions being satisfied:

$$(-f1an)/f1 > 1.35$$

$$v1bp - v1bn < 32.0$$

$$Rm/f2 > 0.78$$

$$v2n - v2p \leq v24.8$$

where f1 denotes a focal length of the first lens group, f2 denotes a focal length of the second lens group, f1an denotes a focal length of a negative lens of which focal length is shortest in the front lens group, v1bp denotes an Abbe number of a positive lens of which Abbe number is largest in the rear lens group, v1bn denotes an Abbe number of a negative lens of which Abbe number is smallest in the rear lens group, Rm denotes a radius of curvature of a cemented surface of the cemented lens of the second lens group, v2p denotes an Abbe number of a positive lens of which Abbe number is smallest in the second lens group, and v2n denotes an Abbe number of a negative lens of which Abbe number is largest in the second lens group.

* * * * *